United States Patent [19]

Hölter et al.

[11] Patent Number: 5,015,451

[45] Date of Patent: May 14, 1991

[54] PROCESS, FILTER AND DEVICE FOR MAKING AVAILABLE HIGH-QUALITY BREATHING AIR

[75] Inventors: Heinz Hölter; Heinrich Igelbüscher, both of Gladbeck; Heinrich Gresch, Dortmund-Wickede, all of Fed. Rep. of Germany

[73] Assignee: Heinz Holter, Gladbeck, Fed. Rep. of Germany

[21] Appl. No.: 327,914

[22] PCT Filed: May 26, 1988

[86] PCT No.: PCT/EP88/00469

§ 371 Date: Jan. 24, 1989

§ 102(e) Date: Jan. 24, 1989

[87] PCT Pub. No.: WO88/09205

PCT Pub. Date: Dec. 1, 1988

[30] Foreign Application Priority Data

| May 27, 1987 | [DE] | Fed. Rep. of Germany | 3718021 |
| Jun. 6, 1987 | [DE] | Fed. Rep. of Germany | 3719067 |
| Jul. 21, 1987 | [DE] | Fed. Rep. of Germany | 3724050 |
| Jul. 25, 1987 | [DE] | Fed. Rep. of Germany | 3724671 |
| Aug. 12, 1987 | [DE] | Fed. Rep. of Germany | 3726762 |
| Aug. 26, 1987 | [DE] | Fed. Rep. of Germany | 3728423 |
| Sep. 15, 1987 | [DE] | Fed. Rep. of Germany | 3730922 |

[51] Int. Cl.$^5$ .............................................. C01B 21/00
[52] U.S. Cl. .................................... 423/235; 110/345; 422/4; 422/28; 55/97; 55/524; 55/318; 261/100; 34/192
[58] Field of Search ..................... 423/245.1, DIG. 17; 422/4, 122; 55/97, 76, 316, 318, 524, DIG. 3; 98/2.11

[56] References Cited

U.S. PATENT DOCUMENTS

| 1,789,194 | 1/1931 | Rockwell | 422/122 |
| 3,017,239 | 1/1962 | Rodman | 55/524 |
| 3,457,040 | 7/1969 | Jennings | 422/122 |
| 3,804,942 | 4/1974 | Kato et al. | 422/4 |

FOREIGN PATENT DOCUMENTS

| 760228 | 12/1970 | Belgium | 422/4 |
| 2087219 | 10/1985 | Japan | 55/524 |

Primary Examiner—Gary P. Straub
Assistant Examiner—A. Lester Burke
Attorney, Agent, or Firm—Herbert Dubno

[57] ABSTRACT

The invention refers to a process, a filter, as well as a device for the elimination of bacteria and/or viruses and/or fungi and/or spores and/or germs and/or allergens and/or pollutants and/or odors, etc from the breathing air by means of a filter consisting of one or several chemisorption mass layers. In order to avoid that biofilters which have been in operation for a longer time do not release fungi spores and bacteria under certain circumstances, the invention proposes that downstream of a biofilter, bulk material is used alternately as very strongly alkaline or very strongly acid chemisorption layers, or vice versa. As bulk material for the individual chemisorption mass layers coal coke of the type III or IV of crushed coke is used, with strongly alkaline and strongly acid chemisorption layers. The individual chemisorption layers are felt layers, which are impregnated with the corresponding liquids to be alkaline, acid and/or neutral, or vice versa, dried and then packed on top of each other to be used as chemisorption filters, whereby between the chemisorption mass layers hydrophobic water-repellant separating layers are inserted. In order to eliminate odors, the chemisorption mass layers consist of active carbon treated with propylene glycol. For the allergens-free humidification of the actual humidifier, upstream of the suction side a chemisorption filter device is provided, which is intended as an absolute barrier for flying allergens and at the same time a germ barrier, whereby after the device is switched off manually or automatically, a barrier is insured also on the outflow side by a bactericidal, fungicidal chemisorption filter.

12 Claims, 1 Drawing Sheet

PROCESS, FILTER AND DEVICE FOR MAKING AVAILABLE HIGH-QUALITY BREATHING AIR

CROSS REFERENCE TO RELATED APPLICATIONS

This is a national phase application of PCT/EP No. 88/00469 filed 26 May 1988 and based on German National Applications Nos. P 37 18 021 of 27 May 1987, P 37 19 067 of 6 June 1987 and P 37 24 0.50 of 21 July 1987 under the International Convention.

1. Field of the Invention

The invention relates to a process, a filter, and a device for the elimination of bacteria and/or viruses and/or fungi and/or spores and/or germs and/or allergens and/or pollutants and/or odors and the like from breathing air using a filter consisting of one or several layers of a chemisorption mass.

2. Background of the Invention

It is known that biofilters and such in operation for longer periods of time release fungus spores and bacteria.

According to the invention, downstream of the biofiltermasses, chemisorption mass filters are arranged in individual layers.

These chemisorption mass layers are arranged in accordance with the invention by alternating strongly alkaline masses of an approx. pH value of 12.8 and strongly acid masses with a pH of 0.5–1.0.

Preferably the following masses are used:

The bulk material is coal coke of the type classified as crushed coke IV or crushed coke III; the coke is soaked in sodium potassium hydroxide potassium- or sodium carbonate or soda lime solution and is used as the alkaline mass with a pH of approx. 12.8.

For the preparation of acid masses with a pH 0.5–1.0, the soaking solutions used are acid FeII/FeIII salts brought with sulfuric acid to a pH-value of 05.–1.0. A pure coke charge of the above-mentioned types of crushed coke is used as the exit layer.

It has been found that the alternating effect of the chemisorption filter arranged downstream of the biofilter, with its alternating effect of strongly alkaline and strongly acid masses, kills the bacteria and fungus spores, which are retained by the bulk material.

After the depletion of the filter, the coke can be supplied as additional fuel to a garbage-incinerator installation.

In order to improve the killing of germs and the elimination of odors from the breathing air through the used chemisorption masses with various pH-values, in repeated alternations of alkaline to acid and/or neutral, or with the reverse alternating effect, the invention provides that dust-arresting substances, particularly in fiber form, be soaked with the specific masses, and in this way be used alternatingly, according to use and the bacteria, germs, fungi or viruses to be killed, either as acid, or as alkaline or vice versa, in hospital areas, residential areas or laboratories, or in case of allergies.

The hereby used humidity-absorbing felt-like mats, soaked with the corresponding alkaline and/or neutral and/or acid washing fluids are dried and then built into the chemisorption filter as a mat-like filtering material, according to the afore-described system.

According to the invention, its further proposed to insert, between the individual alkaline, acid and/or neutral layers, humidity-repellant hydrophobic fleece layers are inserted as intermediate layers, which has as a result that no humidity absorption from the space takes place, and thereby no contacts take place between the alkaline, acid and neutral, or neutral, alkaline and acid layers, and that no neutralizing transfer can result, particularly in acid or alkaline chemisorption layers.

Besides, in the case of allergy sufferers, it has been found appropriate to use as a last chemisorption filter stage, instead of the neutral active coal filter-stage, an alkaline or, corresponding to the allergy an acid acting chemisorption stage.

For this purpose, for instance carbonates and/or acid FeII-containing products are used.

It is known to produce filters for air filtration in car cabins, which filter out the dust.

Furthermore, in order to clean the air, it is known to produce filters which insure a germ-free environment, which are arranged in a bactericidal and fungicidal manner, and which also can be an absolute germ barrier.

It is further known to use chemisorption filters as car filters, which filter the acid pollutants such as $SO_2$, HCl, HF, HC-compounds and $NO_x$, as well as CO-loads, from the supplied breathing air.

Furthermore it is known to use frost-free filters, which through the addition of glycerin or similar substances have also dust-repelling characteristics.

Besides, it is known to use filters which maintain their dust-repelling properties, and through wetting with glycerin or other similar substances, can be used as frost-free filters.

Filter units wherein each individual stage is an absolute filter can not be accommodated in a car, particularly not in a passenger car, because the necessary space is not available neither in the motor area nor in the trunk area are the space conditions sufficiently generous.

In order to install filters for the supply of breathable air meeting the standards of good air quality, in spite of the reduced room or space conditions, it is proposed according to the invention to use a thinner germ-free filter material, i.e. a filter which is so impregnated that it can be penetrated by germs and also can collect the germs, but will not permit their reproduction. According to the invention, a relatively thin, space-saving filter layers with reduced pressure drop can be used.

It is therefore proposed by the invention to subject the filter material to double-acting impregnation, which then create a filter which guarantees a germ-free, pollutant-free, odor-free air, also during the winter in frost conditions.

This is achieved by soaking the filter material in alkaline, acid and additionally in a non-toxic odor-neutral oxidative liquid with delayed action, and then arranging the layers one after the other in the filter, letting them become effective, whereby the alkaline, acid and oxidative treatment of the air acts as an odor neutralizer. In order to make the filter frost-free, the invention proposes further that the impregnation include at the same time an antifreeze (chemical, physical or physiological) and odor-neutral solvent, so that the filter remains active, even under freezing fog.

It is known to eliminate annoying odors by means of activated carbon.

According to the invention, it has been found that due to surface treatment of active carbon with propylene glycol a markedly improved odor absorption is achieved.

Preferably, the application of this propylene glycol layer takes place through vapor deposition.

A further advantage according to the invention is that the first layer subjected to the oncoming flow is an active coal layer treated with propylene glycol and the following layer is only an activated carbon layer.

This means that when the propylene glycol in the first layer is vaporized, this is absorbed in the so-called pure activated-carbon layer and here again contributes to a further activation of the activated coal or carbon.

It is known that humidifiers can collect germs. This can happen especially when the device is not in operation and the room air containing germs and allergens drifts into the device and this way germ and allergens settle for instance on the vaporizer unit and infect it.

When the unit is switched on, the germs which have multiplied in the meantime are again released into the air, constituting an additional load.

This forcibly leads to a supplementary load for people sensitive to allergens.

In order to avoid this, the invention proposes as a rule to mount an antiallergenic, antibacterial and fungicidal chemisorption filter element to the air-inlet side, so that the aspired air which is then humidified, is absolutely germ- and allergen-free.

Further, the invention provides on the outflow side of the humidifier, another antiallergenic, antibacterial and fungicidal chemisorption filter element, in the form of a compulsory lock, which becomes effective when the device is switched off and the operation concluded.

Hereby, the contamination of the wicks for the liquid by the air drifting into the device after it was switched off, is excluded.

The invention is of course not limited to the embodiments which are subsequently described and illustrated in detail, there are numerous possible modifications, without departing from the basic idea to provide the humidifier with the correspondingly effective filter on the suction- as well as on the pressure side.

These filters serve as germ barriers and dust filters.

BRIEF DESCRIPTION OF THE DRAWING

The above and other objects, features and advantages of my invention will become more readily apparent from the following description, reference being made to the accompanying highly diagrammatic drawing in which:

FIGS. 1 and 2 of the attached drawing shows the common humidifier body 1, with water supply container 2 and the wick 3, as well as the inflow side shifted up (FIG. 1) or swung-away (FIG. 2), which is open during the rolled up, respectively the swung-away side 5, which is open during the humidifying process and which after the device is switched off, forcibly closed by a mechanical and practical procedure, so that a secondary bacterial barrier for the resting water and the wick is insured.

Figure 1:
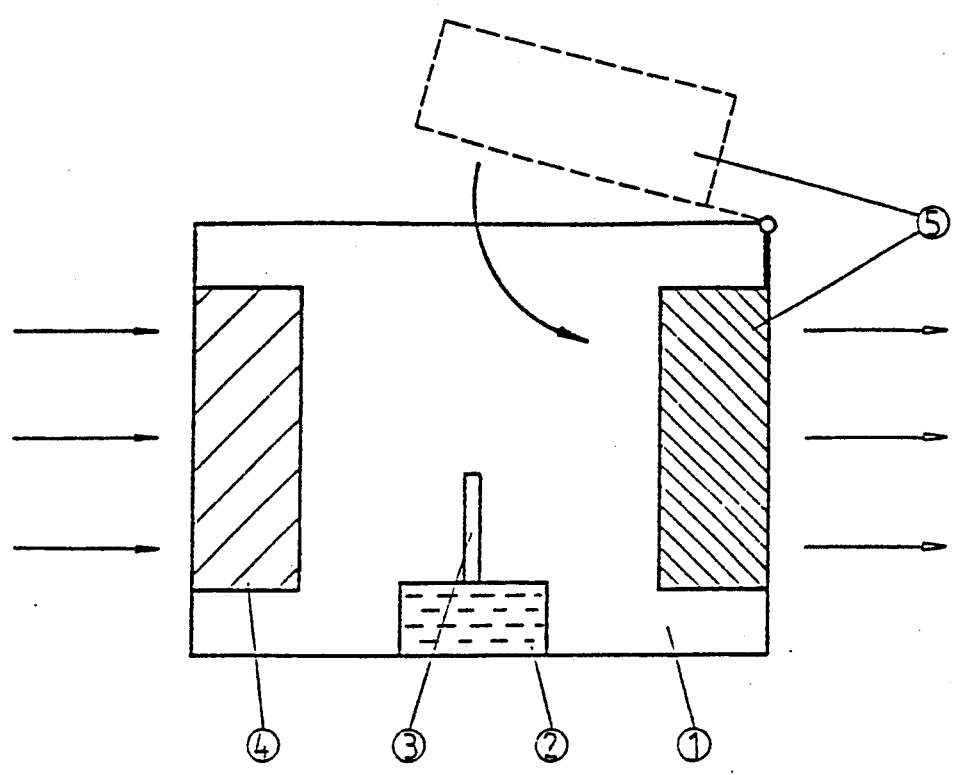
FIGS. 1 and 2 are diagrammatic cross sectional views showing two embodiments of a humidifier according to the invention.
Figure 2:
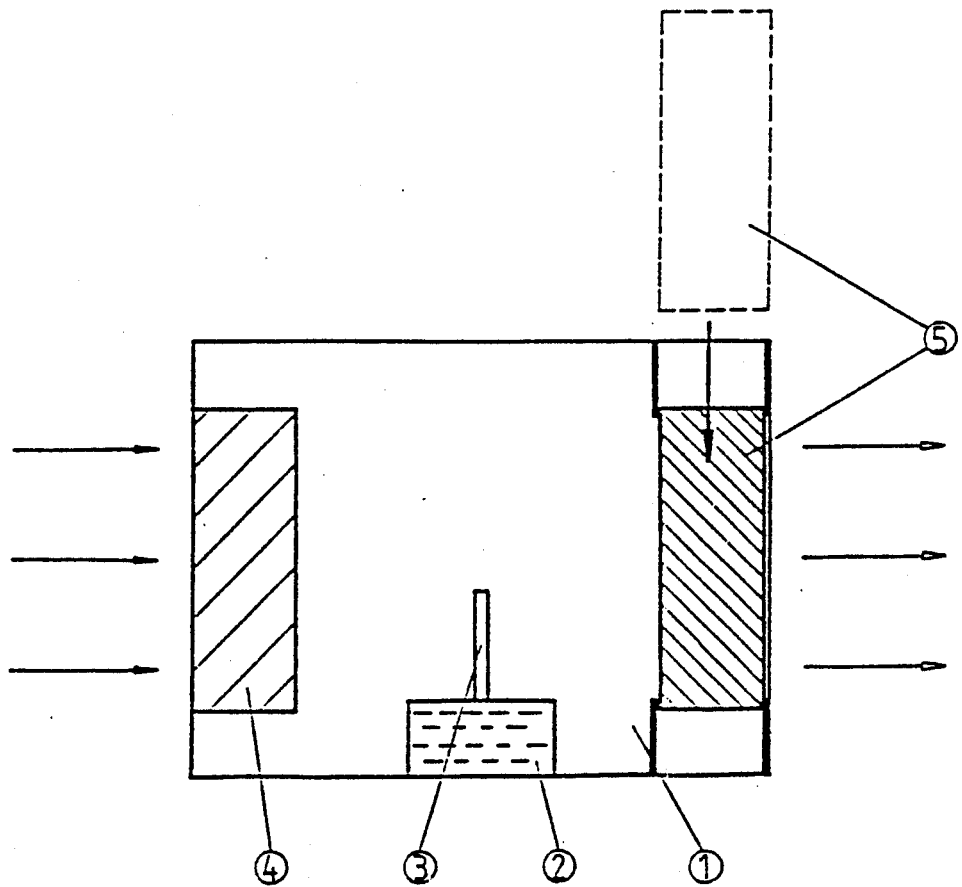

Further, according to the invention it is proposed to forcibly control by sensors the allergen free and bactericidal barrier.

It is known to make available compressed air from compressors via duct systems at the individual beds in hospital rooms, for the supply of respiratory devices. This air is normal outer air which can be loaded with pollutants and germs.

It is furthermore known that diseases of the respiratory tract and of the lung can be caused by respiratory devices connected to compressed-air ducts.

Bacteria, which collect in these ducts, can frequently be the cause of disease.

In order to avoid the formation of bacteria in the compressed-air ducts, the invention provides a bactericidal and fungicidal chemisorption filter system on the suction- and/or on the pressure side of the compressed-air source, compressor, rotary-piston blower, etc. This bactericidal and fungicidal chemisorption filter according to the invention, is characterized by the fact that it consists of chemisorption masses which have a strongly acid or strongly alkaline effect.

Preferably, the pH-value in the acid range lies below 1 and the pH-value in the alkaline range lies above 13.

It is known particularly more recently, to use filters for the elimination of bacteria, viruses, dust-like and gaseous pollutants and all kind of flying allergens also for the purification of the living space.

Thereby it is important to produce filters which, on the one hand, are capable to absorb bacteria and gaseous pollutants and, on the other hand, do not release any damaging substances while they are destroying the bacteria and pollutants.

For this reason, the invention proposes to use filter materials which, in the subsequent burning in a garbage-incinerating plant, act chemisorptively on the pollutants which are released during the incinerating process.

The concept of the invention is based on the possibility to destroy the filters thermally, in an environmentally-friendly manner, without releasing thereby pollutants, but rather using the binding of the pollutants in the incinerating technique.

Therefore, according to the invention, the filter masses are composed of alkaline- and alkaline earth compounds, and in addition a part of iron compounds, e.g. as iron salt, which during the incineration act catalytically in the direction of $NO_x$ reduction.

We claim:

1. A filter for eliminating bacteria, viruses, fungi, spores, allergens, pollutants, and odors from an air stream, comprising a stack of discrete chemisorption filter layers including at least one alkaline layer and at least one acidic layer alternating with one another in said stack and traversed in succession by said air stream.

2. A filter for eliminating bacteria, viruses, fungi, spores, allergens, pollutants and odors from an air stream, comprising a stack of discrete chemisorption filter layers including at least one alkaline layer and at least one acidic layer alternating with one another in said stack and traversed in succession by said air stream,
    each said alkaline layer comprising a bulk carbonaceous material impregnated with sodium hydroxide, potassium hydroxide, sodium carbonate, potassium carbonate or soda lime solution; and
    each said acidic layer comprising a bulk carbonaceous material impregnated with a solution of an Fe(II) salt, an Fe(III) salt or both Fe(II) and Fe(III) salts adjusted to a pH of 0.5 to 1.0 with sulfuric acid.

3. The filter defined in claim 2 wherein said stack is disposed downstream of a biological filter.

4. The filter defined in claim 2 wherein said bulk carbonaceous material is a fiber felt or type III or type IV crushed coke.

5. The filter defined in claim 2, further comprising nonimpregnated hydrophobic water-repellent separating layer interposed between said acidic and alkaline layers.

6. The filter defined in claim 2, further comprising an active carbon filter layer forming a final downstream layer of said stack.

7. The filter defined in claim 2, wherein at least some of said layers are impregnated with an antifreeze odor-neutral solvent ensuring operation of said filter at below-freezing temperatures.

8. The filter defined in claim 7 wherein said solvent is propylene glycol.

9. The filter defined in claim 2 wherein each said alkaline layer has a pH above 13 and each said acidic layer has a pH below 1.

10. A humidifier for humidifying an air stream, comprising:
- a housing having an inlet and an outlet side;
- a filter as defined in claim 2 across said inlet side;
- a source of water and a wick in said water disposed in said housing; and
- a filter as defined in claim 2 shiftable across said outlet side upon shutdown of said humidifier.

11. A method of eliminating bacteria, viruses, fungi, spores, allergens, pollutants and odors from an air stream, comprising the steps of:
   (a) forming a stack of discrete chemisorption filter layers including at least one alkaline layer and at least one acidic layer alternating with one another in said stack,
   each said alkaline layer comprising a bulk carbonaceous material impregnated with sodium hydroxide, potassium hydroxide, sodium carbonate, potassium carbonate or soda lime solution, and
   each said acidic layer comprising a bulk carbonaceous material impregnated with a solution of an Fe(II) salt, an Fe(III) salt or both Fe(II) and Fe(III) salts adjusted to a pH of 0.5 to 1.0 with sulfuric acid; and
   (b) passing said air stream in succession through said layers.

12. The method defined in claim 11, further comprising the step of:
   (c) destroying said stack by combusting same in an incinerator whereby components of said stack exercise a pollutant-binding effect and catalytically reduce $NO_x$.

* * * * *